June 19, 1923.
J. J. PIQUÉ
1,458,991
COOLING AND FREEZING OF FISH AND THE LIKE
Filed March 22, 1922 4 Sheets-Sheet 1
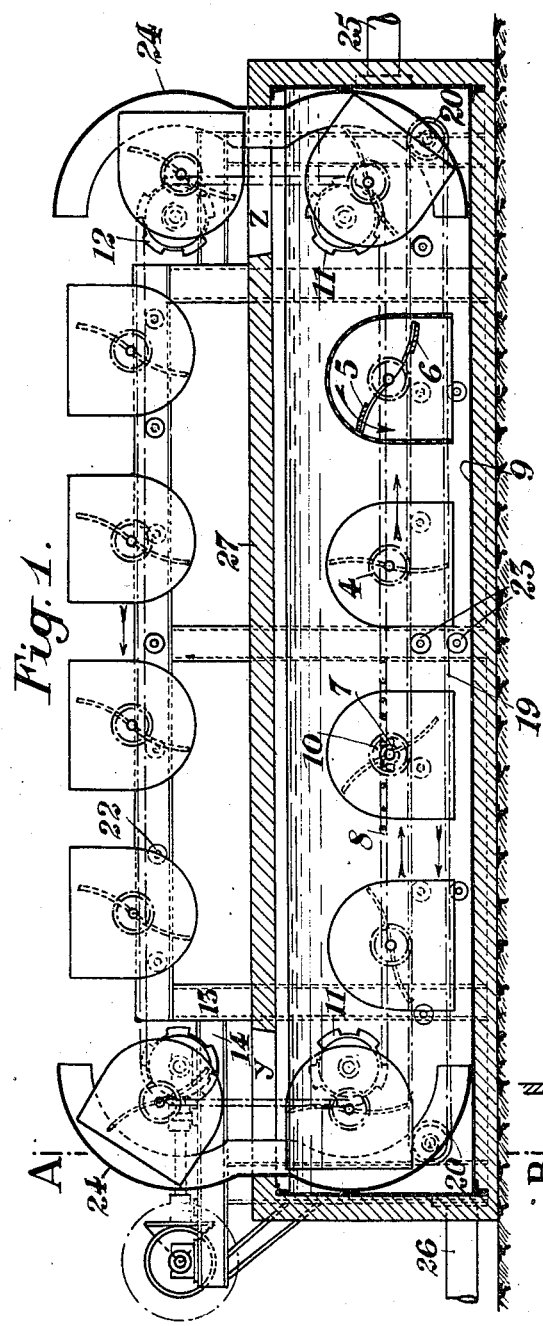
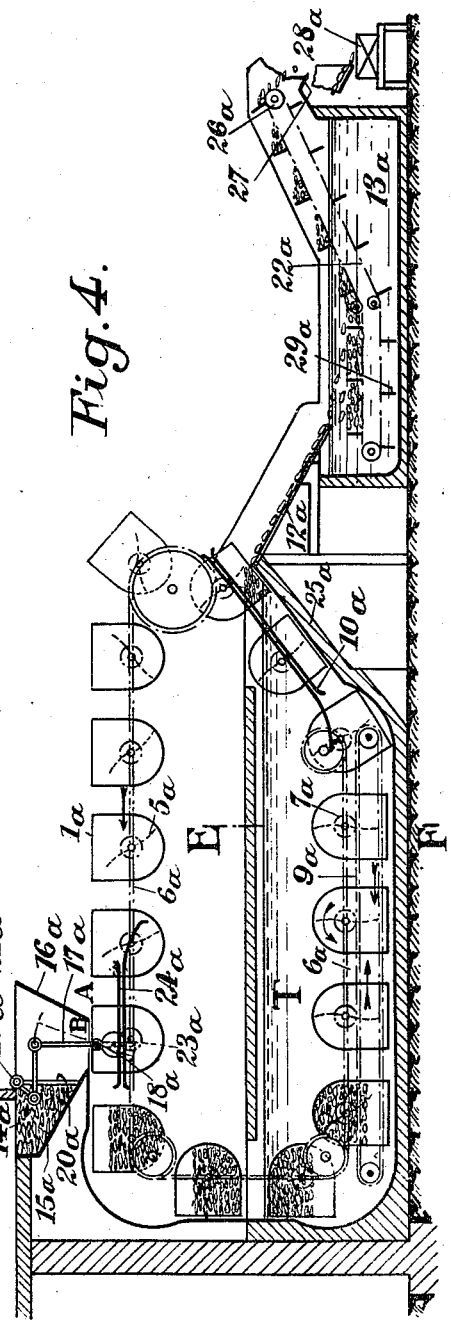
INVENTOR:
JEAN JULIEN PIQUÉ
ATTORNEY.

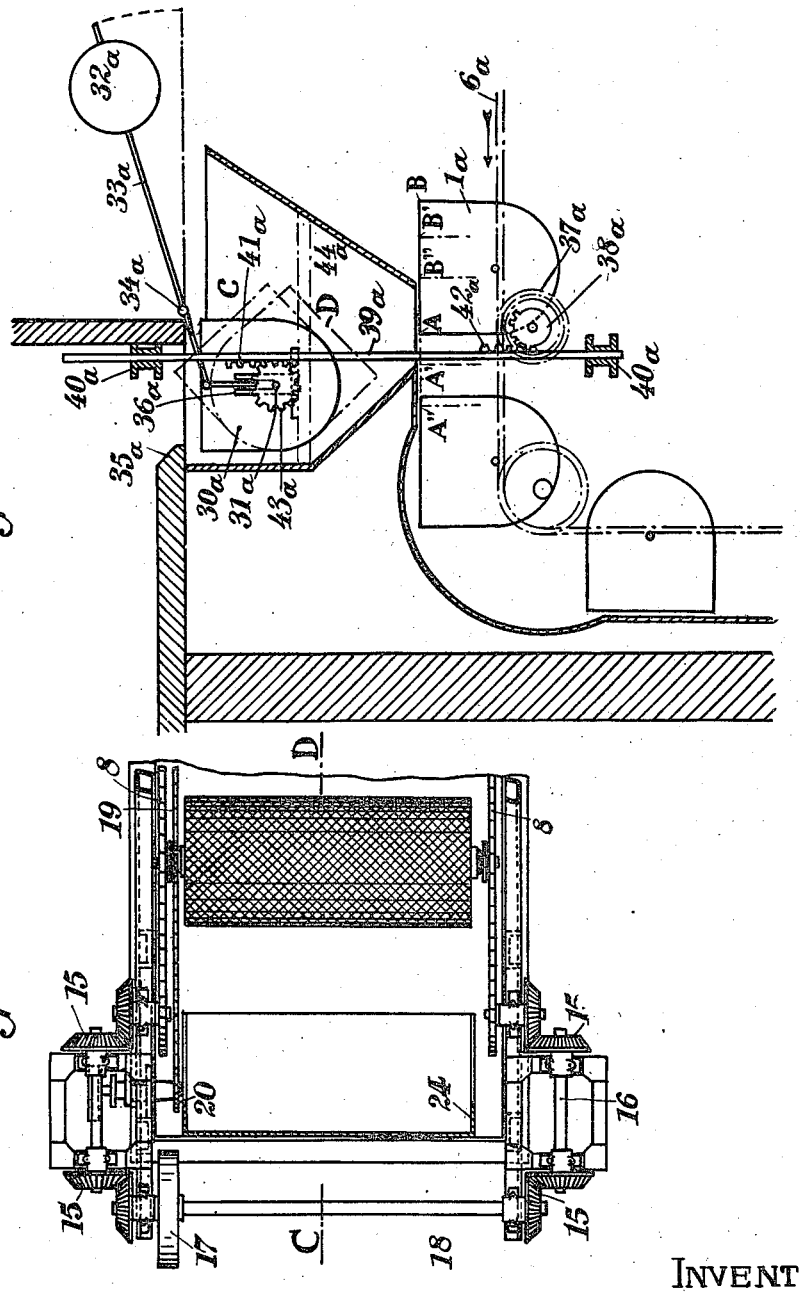

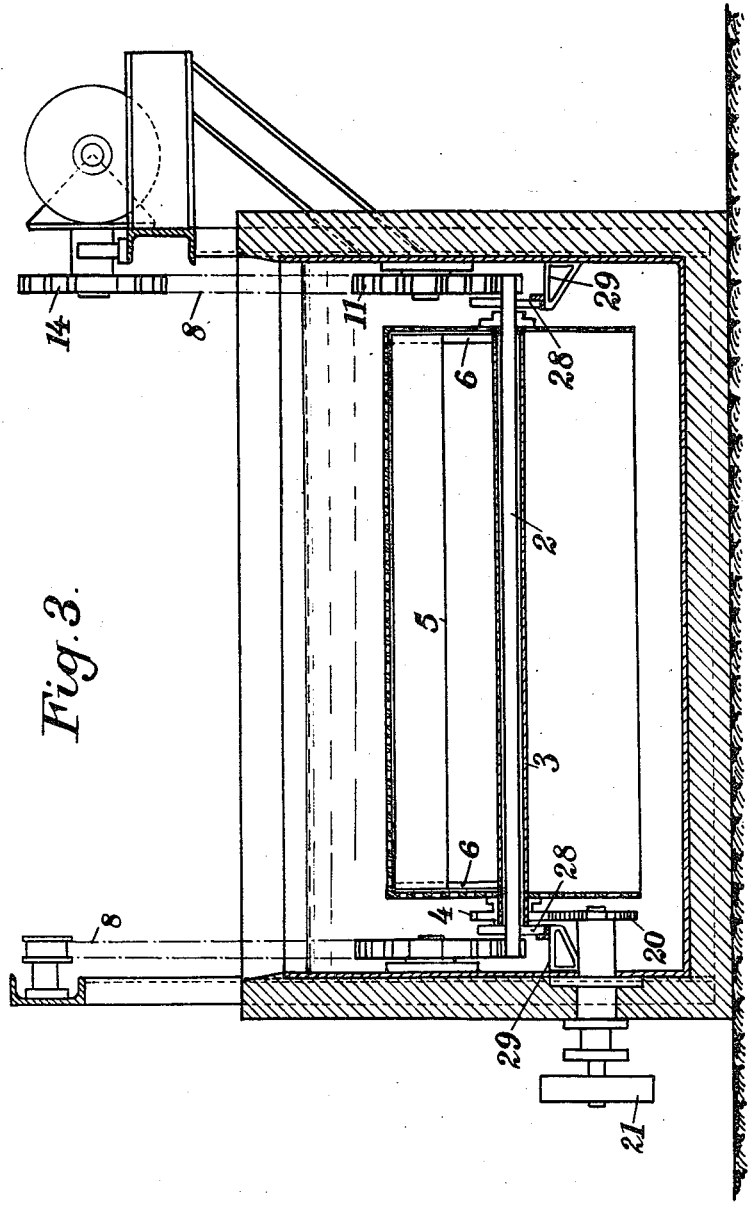

June 19, 1923.  
J. J. PIQUÉ  
1,458,991.  
COOLING AND FREEZING OF FISH AND THE LIKE  
Filed March 22, 1922 4 Sheets-Sheet 4

INVENTOR:  
JEAN JULIEN PIQUÉ.  
ATTORNEY.

Patented June 19, 1923.

1,458,991

UNITED STATES PATENT OFFICE.

JEAN JULIEN PIQUÉ, OF LONDON, ENGLAND.

COOLING AND FREEZING OF FISH AND THE LIKE.

Application filed March 22, 1922. Serial No. 545,816.

*To all whom it may concern:*

Be it known that I, JEAN JULIEN PIQUÉ, a subject of the King of Belgium, and resident of London, N. W. 3, Adelaide Road, Hampstead, England, have invented certain new and useful Improvements in and Relating to the Cooling and Freezing of Fish and the like, of which the following is a specification.

This invention relates to the cooling or freezing of fish and the like and has for its object to provide improvements in or modifications of the methods and means set forth in U. S. Patent application Serial No. 383283.

It will herein be described with reference to the freezing of fish but it is not limited thereto. For instance, it may be applied to the cooling or freezing of meat or fruit and of other food stuffs by immersion in a cooling liquid which is non-congealable at the temperature required, the cooling liquid not necessarily being a sodium chloride solution, but any suitable salt in solution including salt-petre, or it may be a solution other than brine, such as a solution of sugar.

The present invention consists in a method of cooling or freezing fish or like food stuffs by immersing them in a cooling liquid, in which they tend to float or do not tend to sink, which consists in conveying the containers into the influence of the cooling liquid, shuffling the articles by causing them to move through the liquid while totally immersed therein by means of rotating arms or paddles acting directly upon some of them, moving the containers through the liquid and removing them therefrom, the introduction to, passage through and removal from the liquid being effected by the same uniform and continuous movement of a conveying chain.

The invention also consists in apparatus for cooling or freezing fish or the like including one or more receptacles which are constantly moved whilst in contact with the liquid cooling medium and within which fish are thoroughly shuffled whilst immersed in the liquid cooling medium by being rotated about a definite axis relatively to the receptacles by means of one or more rotating arms or paddles acting directly upon the fish.

The invention also consists in apparatus for the cooling or freezing of fish or the like as indicated above including receptacles without a lid or means of closing the feed opening, arrangements being provided to prevent the articles from leaving the receptacles while moving towards, through and out of the cooling liquid.

The invention also consists in apparatus for the cooling or freezing of fish or the like as indicated above including automatic discharging, charging and weighing apparatus for the articles under treatment.

The invention also consists in apparatus for cooling or freezing fish or the like including a glazing tank provided with an endless conveyor.

The invention also consists in the improved constructions of fish and like cooling or freezing apparatus hereinafter indicated.

Referring to the accompanying diagrammatic drawings:

Fig. 1 is a sectional view through C—D of Fig. 2.

Fig. 2 is a partial plan view.

Fig. 3 is a sectional elevation through A—B of Fig. 1.

Fig. 4 represents a longitudinal sectional elevation of a modification.

Fig. 6 represents a modified form of automatic charging apparatus.

Figure 5:
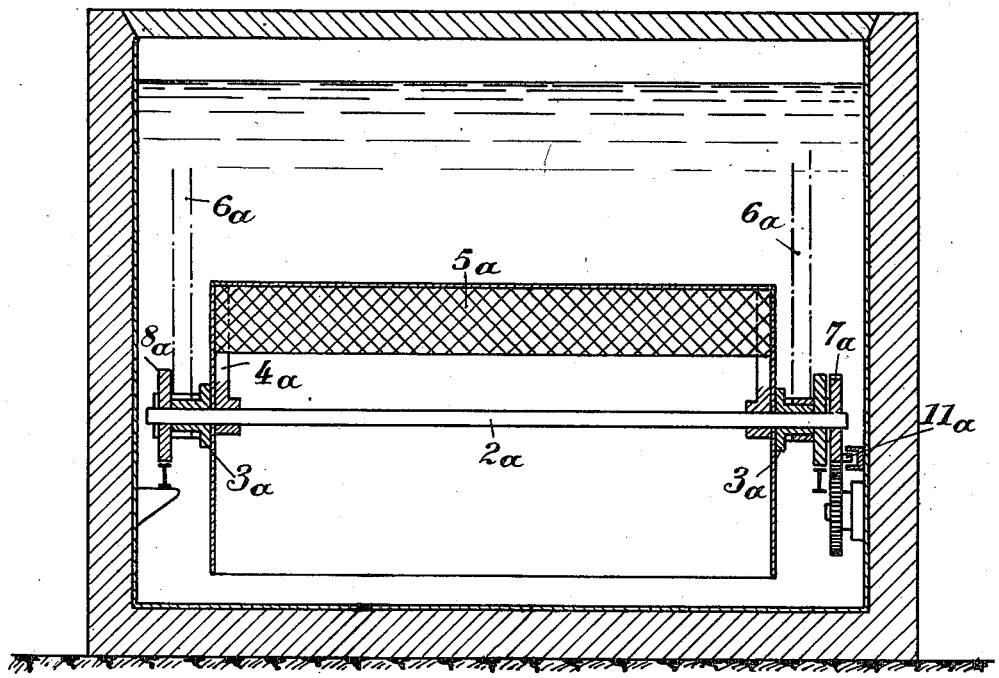
Fig. 5 is a sectional elevation through E—F of Fig. 4.

In carrying the invention into effect in one form, illustrated by way of example in Figs. 1-3, the container of the fish has the shape of an oblong box 1 without a lid, the bottom being a half cylinder and the straight part of the sides being a few inches longer than the radius of said half cylinder. The section of container 1 has a U form. The half cylinder is made in plain plate, the straight part of the sides in perforated plate and the lateral sides in plain plate, or the longitudinal and lateral sides of the container are made in perforated plate. A spindle 2 longer than the length of the container is fitted in the centre of the half circular form of the lateral sides. A hollow shaft 3 is slid over spindle 2 with running fit. Shaft 3 at one end comes up to near the inside of the lateral side of container 1 and passes through the other lateral side where at the end of the shaft is fixed a chain-wheel 4. A paddle made of two or more perforated plates 5 is fixed on hollow shaft 3 by arms 6. On one side the container 1 rests on hollow shaft 3; on the other side the container is fixed on spindle 2; this end of the spindle has a groove 7. Two endless chains 8 travel inside along two sides of the brine tank 9; some of the links of the chains are fitted as bearings 10 in which spindles 2 are lodged. The groove 7 of spindle 2 allows the fixing of container 1 in a definite position on chains 8 by means of a bearing-cover with tongue, so that when travelling over the top of the tank 9 the containers are with the opening upwards. The endless chains 8 run over chain-wheels 11 fitted in supports fixed at the sides of the tank, over chain-wheels 12 fitted in supports placed on frame 13 and receive their movement from chain-wheels 14. The support of chain-wheels 12 are fixed on slides to allow tension of the chains 8. In order to obtain the same travelling speed for the two chains, chain-wheels 14 are commanded by pairs of bevel wheels 15 fixed on shafts 16 and 18 with general command from pulley 17. On one side inside the tank runs on endless chain 19 over chain-wheels 20 of which one is fitted in a support fixed on the side of the tank, and the other fixed on a spindle turning in a stuffing-box with command from outside by pulley 21. Rollers 22 with supports fixed on frame 13 support chains 8. Rollers 23 support chains 19. Loose rollers 28 on each end of spindle 2 support containers 1 and chains 8 when immersed in the brine by travelling on rails 29. The containers 1 being filled about five-eighths full with fish and fixed on chains 8 are conveyed into the brine. When passing over chain-wheels 12 and 11 the upper part of the container described a definite curve according to which plate 24 is bent and fixed on the brine tank in order to keep the containers closed during their journey from outside the tank into the brine. The part of plate 24 which is in the brine is perforated. The paddle 5 starts revolving when chain-wheel 4 is gripped by chain 19. Owing to the difference in density of the brine and the fish the latter float up and are caused to rotate in the brine while the containers 1 move with their opening downwards from one end of the tank to the other. The speed of chains 8 is regulated according to the time of immersion required for the cooling or freezing of the fish. When leaving the brine, the containers are kept closed by plate 24; by opening the cover of bearing 10, a container 1 can be swung round and the frozen fish fall on the chute on the cover of the tank and from there into boxes for despatch or storage. The tank is placed in an insulated casing 27 with, in the cover, an opening Y for the entrance of the containers and an opening Z for the lifting out of the containers. The brine inlet is distributed by pipe 25; the outlet is through pipe 26.

In carrying the invention into effect according to a modification embodying automatic discharging, charging and weighing apparatus for the articles under treatment, as illustrated in Figs. 4, 5 and 6, a tank T contains the cooling liquid. This tank is placed in an insulated casing with an opening Y in the cover for the entrance of the fish containers and an opening X where the containers leave the brine.

The container of the fish has the shape of an oblong box $1^a$ without a lid, the bottom being half a cylinder and the straight part of the sides a few inches longer than the radius of said half-cylinder. The section of the container has a U form. The half-cylinder is made in plain plate; the straight part of the sides is in perforated plate. The lateral sides are in plain plate. A spindle 2 longer than the length of the container is fitted in the centre of the half-cylinder form of the lateral sides. Spindle 2 turns in bearings $3^a$ fixed on the lateral sides. The bearings $3^a$ are fitted in one of the links of the chains $6^a$ so that the container is always in a fixed definite position respectively of the chains. A chain $9^a$ moving inside the tanks acts on cog wheels $7^a$ and thus applies a rotating movement to paddle $5^a$ fixed on spindle 2 by arms $4^a$. Each end of spindle 2 has a loose roller $8^a$ supporting the containers $1^a$. The loose rollers run on a rail of I form.

*Automatic charging of the apparatus.*

Above the apparatus is fixed a box $14^a$ in which is thrown the quantity of fish required for one container, this quantity filling box $14^a$ completely. The bottom $15^a$ of box $14^a$ is sloped. The box is kept closed by a vertical side $20^a$ which can turn round pivots $19^a$. The spindle 2 of the container $1^a$ moving in the direction of the arrow, butts against the end of lever $17^a$, pushes said lever which turning round pivot $18^a$ opens the side $20^a$ by means of rods $21^a$. When the spindle 2 has cleared the lower end of lever $17^a$, the weight $23^a$ fixed on the lower part of lever $17^a$ brings the side $20^a$ in a closing position. A slope $16^a$ is provided to direct the fish to the containers. The filling of the containers is completed before point A reaches point B. In order to keep the paddle $5^a$ in a vertical position a guide 24 is provided acting in a similar way to the guide $10^a$ described further.

*Automatic emptying of the frozen contents.*

Where the fish containers leave the brine the tank is shaped partly cylindrical followed by a slope $25^a$ in order to keep the containers closed when leaving the tank. The containers move over the slope $25^a$ with their straight sides vertical to that slope and their opening downwards.

The sloping surface $25^a$ joins a sloping surface $12^a$ at a point above the brine level and thus the frozen articles fall out of the containers on chute $12^a$, sliding thence into boxes for packing, into a glazing tank, or being collected in any convenient manner. But because paddle $5^a$ stops revolving as soon as the containers move obliquely on to the slope $25^a$ (cog-wheel $7^a$ being no longer in contact with chain $9^a$) it may happen that the paddle $5^a$ is in such a position that it would retain part of the frozen articles. To empty the containers completely without any handling the paddle ought to remain in a position vertical to slope $25^a$. This is obtained by a pivot $11^a$ fixed in the cog-wheel $7^a$. Pivot $11^a$ is caught by guide $10^a$ of which the beginning has a curved shape which thus directs the pivot $11^a$ and brings paddle $5^a$ in the required vertical position.

The glazing tank is filled with fresh water which may be renewed gradually, the water being generally cooled to near the freezing point so that when the frozen fish has been immersed therein for a very short time the brine is washed off and upon removal of the fish the adhering film of water is immediately frozen and the fish thus covered completely with a layer of ice called "glaze" which prevents the fish from drying out and losing weight during storage.

The present arrangement shows a glazing tank out of which the fish is removed in a continuous manner without handling in the following way.

Two endless chains $22^a$ move on each side of tank $13^a$ and carry the fish through the water and out of it, the glazed fish being discharged at roller $26^a$ from whence they fall on a chute $27^a$ and into boxes $28^a$ for storage or despatch. A continuous and flexible band is formed to carry the fish by joining the links of the two chains with iron rods. Compartments are formed with partitions preferably in perforated plate or wire netting $29^a$ fixed vertically to the chains.

A modified form of charging apparatus is represented in Fig. 6.

A given quantity in weight of fish requires the removal of a certain number of B. t. u.'s during the cooling or freezing. Certain flat fish may occupy a different volume from that required by round fish for the same weight. It may therefore be desirable to fill each container with the same quantity in weight of fish, and it will be understood that the charging arrangement described hereafter achieves this result by filling each container automatically with the same weight of fish.

According to Fig. 6 the fish is thrown in a box $30^a$ which can turn round pivot $31^a$ not fixed in the centre of gravity of the box. A balancing weight $32^a$ fixed on lever $33^a$ and pivoting on axle $34^a$ keeps the container $30^a$ in its upper position against edge $35^a$ of the opening in the charging floor. When the container $30^a$ is filled with the required weight of fish it moves downwards with the pivots $31^a$ sliding in guides $36^a$ which then act as supports and bearings. The chain $6^a$ carrying the containers $1^a$ act on a cog-wheel $37^a$ fixed on a spindle on which is fixed a roller $38^a$ which is partly provided with teeth. The circumference measured at the pitch diameter of cog-wheel $37^a$ is the same length as the distance from centre to centre between each fish container. A straight rod $39^a$ can move up and downwards in guides $40^a$ and is provided over a certain part of its length with teeth $41^a$ and $42^a$. The developed length of the teeth on roller $38^a$ is the same as the length of the toothed part of $42^a$. On the pivot $31^a$ and outside the container $30^a$ is fixed a cog-wheel $43^a$ whose teeth act on the toothed part $41^a$. The chain $6^a$ implies a rotating movement to cog-wheel $37^a$ which movement is transmitted into a straight vertical movement of rod $39^a$ which by the toothed part of $41^a$ acting upon cog-wheel $43^a$ implies a turning movement to the container $30^a$ of which the contents fall into chute $44^a$. The last tooth of $38^a$ has then released the rod $39^a$ and the empty container $30^a$ swings itself round into its original position while turning round pivot $31^a$ placed out of the centre of gravity. This turning movement sided by the weight $32^a$ brings the rod $39^a$ into its initial position. As the circumference of cog-wheel $37^a$ corresponds to the distance between two containers, the tipping over of the charging box $30^a$ takes place each time a container $1^a$ passes underneath the gutter $44^a$.

The drawing shows the position of the fish in the charging apparatus, in some of the containers, how the fish is discharged into the glazing tank and carried out of same.

The forms of the invention described above are given by way of examples only, and modifications may be made.

Having now fully described my said invention, what I claim and desire to secure by Letters Patent, is:

1. In an apparatus for cooling or freezing fish and like foodstuffs, the combination with a receptacle into which the fish may be tumbled, said receptacle having the shape of an oblong box without a lid and being of U-section, of a paddle extending substantially the length of the receptacle and fitting more or less closely against the semi-cylindrical sides thereof, means for rotating said paddles, curved blades arranged radially on said paddles, a conveying chain cooperating with said receptacle, and means for alternately keeping the receptacle in a fixed position on said conveying chain and permitting rotational freedom between the receptacle and said chain, substantially as set forth.

2. In an apparatus for cooling or freezing fish and like foodstuffs, the combination with a plurality of receptacles into which the fish may be tumbled, said receptacles being formed of oblong boxes of U-shaped cross section without a lid, means for preventing the contents from leaving the open receptacles in operation, of paddles extending substantially the length of the receptacles and fitting more or less closely against the semi-cylindrical sides thereof, means for rotating said paddles, curved blades arranged radially on said paddles, a conveying chain cooperating with said receptacles, and means for alternately keeping the receptacles in a fixed position on said conveying chain and permitting rotational freedom between the receptacles and said chain, substantially as set forth.

3. In an apparatus for cooling or freezing fish and like foodstuffs, the combination with a plurality of oblong receptacles of U-shaped cross section without a lid, means for preventing the contents from leaving the open receptacles in operation, rotatable devices within said receptacles and extending substantially the length thereof, and means for rotating said devices, of a conveying chain cooperating with said receptacles, a hopper arranged above the receptacles to fill the same successively with the required quantity of fish and the like, and means operated by the conveying chain to effect the charging of the receptacle moved under said hopper, substantially as set forth.

4. In an apparatus for cooling or freezing fish and like foodstuffs, the combination with a plurality of oblong receptacles of U-shaped cross section without a lid, means for preventing the contents from leaving the open receptacles in operation, rotatable devices within said receptacles and extending substantially the length thereof, and means for rotating said devices, of a conveying chain cooperating with said receptacles, a hopper arranged above the receptacles to fill the same successively with the required quantity of fish and the like, means operated by the conveying chain to effect the charging of the receptacle moved under said hopper, and means for indicating that the exact weight of fish and the like will be fed into each receptacle, substantially as set forth.

5. In an apparatus for cooling or freezing fish and the like, the combination with a tank containing cooling brine and the like, a plurality of receptacles for fish and the like, an endless chain for conveying said receptacles through said cooling tank, means for successively and automatically charging said receptacles with a predetermined quantity of fish and the like, and means for automatically emptying said receptacles when they leave the cooling tank, of a glazing tank arranged to receive the frozen contents from said receptacles, and means for conveying said contents continuously through said glazing tank and out therefrom, substantially as set forth.

6. In an apparatus for cooling or freezing fish and the like, the combination with a tank containing brine and the like, a plurality of receptacles for fish and the like, an endless chain for conveying said receptacles through said cooling tank, rotatable means within each receptacle, means for successively and automatically charging each receptacle with a predetermined quantity of fish and the like, and means for automatically emptying said receptacles when they leave the cooling tank, of a glazing tank arranged to receive the frozen contents from said receptacles, and an endless conveyer for carrying said contents through the glazing tank and out therefrom and delivering the same into boxes and the like for despatch or storage, substantially as set forth.

JEAN JULIEN PIQUÉ.